United States Patent
Takano et al.

(10) Patent No.: US 7,308,015 B2
(45) Date of Patent: Dec. 11, 2007

(54) MOBILE COMMUNICATION CONTROL METHOD, CELLULAR SYSTEM, MOBILE STATION, BASE STATION, AND BASE STATION CONTROL APPARATUS

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 753 days.

(21) Appl. No.: 10/312,086

(22) PCT Filed: Jun. 18, 2001

(86) PCT No.: PCT/JP01/05172

§ 371 (c)(1),
(2), (4) Date: Dec. 23, 2002

(87) PCT Pub. No.: WO01/99462

PCT Pub. Date: Dec. 27, 2001

(65) Prior Publication Data

US 2004/0110524 A1 Jun. 10, 2004

(51) Int. Cl.
*H04B 1/00* (2006.01)
(52) U.S. Cl. .......................... 375/130; 455/436
(58) Field of Classification Search ............ 375/130; 370/329–333; 455/436–443
See application file for complete search history.

(56) References Cited

U.S. PATENT DOCUMENTS

| | | | | |
|---|---|---|---|---|
| 5,367,559 A * | 11/1994 | Kay et al. | ........... | 455/425 |
| 5,710,974 A * | 1/1998 | Granlund et al. | ........... | 455/436 |
| 5,799,005 A | 8/1998 | Soliman | | |
| 6,021,123 A * | 2/2000 | Mimura | ........... | 370/331 |
| 6,351,642 B1 * | 2/2002 | Corbett et al. | ........... | 455/442 |
| 6,564,057 B1 * | 5/2003 | Chun et al. | ........... | 455/437 |
| 6,570,862 B2 * | 5/2003 | Virtanen | ........... | 370/335 |
| 6,721,564 B1 * | 4/2004 | Kobayashi | ........... | 455/436 |
| 6,754,493 B1 * | 6/2004 | Jetzek | ........... | 455/436 |

FOREIGN PATENT DOCUMENTS

| | | |
|---|---|---|
| EP | 0 884 918 A2 | 12/1998 |
| EP | 0 897 251 A1 | 2/1999 |
| EP | 0 989 690 A2 | 3/2000 |
| JP | 09-051571 | 2/1997 |
| JP | 11-069416 | 3/1999 |
| JP | 11-122654 | 4/1999 |
| JP | 11-252613 | 9/1999 |
| JP | 2000-078639 | 3/2000 |
| JP | 2000-082992 | 3/2000 |

* cited by examiner

*Primary Examiner*—Khanh Tran
(74) *Attorney, Agent, or Firm*—Foley & Lardner LLP

(57) ABSTRACT

To decrease the number of base stations transmitting when a mobile station is connected to a plurality of base stations during handover and to let a base station having the best reception quality perform transmission so as to decrease interference in downlink and increase the link capacity. A mobile station periodically measures a pilot signal transmitted from a base station in a reception monitor 406 and estimates its own movement speed at predetermined intervals based upon the reception electric field strength of the pilot signal in a speed estimate device 407 in soft handover state. A time length for measuring the pilot signal transmitted from the base station corresponding to the movement speed and an inner threshold value for deciding transmission base stations during handover are altered in a control section 408. In this case, when the movement speed is slow, the pilot signal measurement time length is set short, and the inner threshold value is set small, and when the movement speed is fast, the pilot signal measurement time length is set long, and the inner threshold value is set large.

12 Claims, 14 Drawing Sheets

MOBILE COMMUNICATION CONTROL METHOD, CELLULAR SYSTEM, MOBILE STATION, BASE STATION, AND BASE STATION CONTROL APPARATUS

TECHNICAL FIELD

The present invention relates to a mobile communication control method and a cellular system in which the number of base stations transmitting during handover is decreased and which are suitably employed in a case where a probability that an optimum base station for a mobile station transmits is increased and a mobile station and a base station controller which are employed therefor.

BACKGROUND ART

In a cellular system employing direct sequence code divisional multi access, since the same frequency bands are employed in a plurality of channels, other channels' radio signals become interference, and the reception quality of a desired wave deteriorates when interference increase, thereby causing disconnection of a link or the like. Therefore, the number of links through which talking at the same time is possible while a constant standard of speech quality is maintained, that is, a link capacity, depends on the amount of the interference.

Thus, in a cellular system employing the direct sequence code divisional multi access, when transmission from a base station to a plurality of mobile stations is implemented, the transmission power value of the base station is controlled in order that a downlink signal that each mobile station generally receives is at a required minimum reception level. That is, a closed loop control is implemented wherein while each mobile station periodically measures the reception quality of a signal that the base station transmits, a signal instructing the base station to decrease the transmission electric power is transmitted when the measured reception quality exceeds a predetermined target value, and a signal instructing the base station to increase the transmission electric power is transmitted when the quality is less than the predetermined target value. Typically, in this control, a high speed closed loop type control for each slot is performed so that the reception level in a mobile station becomes a minimum reception level capable of talking.

In general, in handover of a cellular system employing the direct sequence code divisional multi access, a technique called soft handover is employed. This technique is one in which when a mobile station reaches to a cell boundary area of a base station with which the mobile station communicates so that the reception level of downlink decreases due to a propagation loss or the like, a link is set up also with a base station adjacent to the base station to implement simultaneous connections. Thus, the mobile station periodically measures pilot signals that each base station transmits at a predetermined electric power, and when a base station exists in which the difference between the reception level from a presently communicating base station and that thereof becomes within a predetermined threshold value, base stations are chosen so that the number of the base stations is within a predetermined maximum number in the order of good quality to implement simultaneous connections.

In a mobile station during the soft handover, the same down information is received from a plurality of base stations to implement a diversity synthesis. In a vicinity of a cell boundary, since the distance from a base station is long, the reception quality deteriorates. Although link quality tends to deteriorate due to interference from another cell, by a diversity effect caused by connection with such plurality of base stations, deterioration in downlink quality can be prevented.

However, since a plurality of links are employed for one mobile station in the soft handover, interference in downlink increases compared to a cellular system in which the soft handover is not employed, causing a problem that increase in the link capacity cannot be achieved.

As a technique for solving this problem, Japanese Patent Publication No. H11(1999)-69416 discloses a transmission electric power control technique of a base station selection type in which the downlink capacity is increased by specifying transmission base stations actually transmitting among a base station group during the soft handover.

In this transmission electric power control technique of the base station selection type, a base station group and links are set up wherein the differences in the reception qualities are within a threshold value, and further transmission base stations to actually transmit are selected from among the base station group with which links are set up. The transmission base station is supposed to be one in which the difference in the reception qualities is within an inner threshold value which is smaller than the threshold value of the time of setting links up, and the base station other than the transmission base station with which links are set up switches its transmission electric power to a predetermined minimum transmission power value. Thus, it becomes possible to reduce interference of downlink while maintaining an advantage in smooth handover switching in the conventional soft handover, and therefore the link capacity can be increased.

However, since there is a delay time, for transmitting a measured result to the base station, between time of measuring the reception quality and time of actually transmitting, and since the reception level is changing due to fading or the like, the reception level changes during the delay time, and a drift occurs between the measured result and the reception quality of the time of actual transmission.

Accordingly, even when a transmission base station is decided in the order of good quality at the time of measuring the reception quality, a case where a base station having a good quality is not included in the transmission base stations at the time of actual transmission may occur. In this case, not the best base station but a base station having a greater propagation loss has to transmit. Typically, since the reception quality at a mobile station is controlled so as to satisfy a desired standard by a transmission electric power control of a high speed closed loop type, there is a problem that the transmission electric power of a base station is high, interference electric power for other mobile stations increases, and the link capacity decreases.

Accordingly, it is an object of the present invention to decrease the number of transmission base stations and increase the downlink capacity while enhancing the possibility that the best base station is included.

DISCLOSURE OF INVENTION

In order to achieve the above described object, a mobile communication control method according to the present invention is a mobile communication control method in a cellular system comprised of a plurality of base stations, a mobile station setting up links with the base stations, and a base station controller connected to the base stations, wherein a pilot signal is transmitted from the base stations at a predetermined electric power, a reception quality of each pilot signal transmitted from the plural base stations is periodically measured, plural base stations with which links are set up are decided corresponding to the measurement result, one or more transmission base stations are decided from among the plural base stations with which the links are set up to inform the plural base stations with which the links are set up, each base station controls transmission to the mobile station corresponding to the information, and the decision is made when the transmission base station is decided so that the number of transmission base stations is made small and the probability that the best base station in the reception quality of the pilot signal in the mobile station is included in the transmission base stations is made high based upon a predetermined condition, wherein a measurement time length of the reception quality of the pilot signal in the mobile station is altered for each mobile station.

A cellular system according to the present invention is a cellular system composed of a plurality of base stations, a mobile station setting up links with the base stations, and a base station controller connected to the base stations, wherein a pilot signal is transmitted from the base stations at a predetermined electric power, the base station periodically measures a reception quality of each pilot signal transmitted from the plural base stations, the plural base stations with which links are set up are informed of one or more transmission base stations from among the plural base stations with which links are set up, each base station controls transmission to the mobile station corresponding to the information, and when the transmission base stations are decided, the decision is made based upon a predetermined condition, whereby the number of transmission base stations is made small and the probability that the best base station in the reception quality of the pilot signal in the mobile station is included in the transmission base stations is made high, wherein a measurement time length of the reception quality of the pilot signal in the mobile station is altered for each mobile station.

A mobile station according to the present invention comprises a measurement means for periodically measuring a reception quality of a pilot signal transmitted from plural base stations, a decision informing means for deciding one or more transmission base stations from among plural base stations with which links are set up corresponding to the measurement result and for informing the plural base stations with which the links are set up of the decision result, said decision being made based upon a predetermined condition so that the number of transmission base stations is made small and the probability that the best base station in the reception quality of the pilot signal in the mobile station is included in the transmission base stations is made high, and a alteration means for altering a measurement time length of the reception quality of the pilot signal by the measurement means based upon a movement speed detected in the base station or the mobile station.

A base station controller according to the present invention comprises a setting informing means for setting a measurement time length for periodically measuring a reception quality of a pilot signal that a mobile station receives from a base station for each mobile station to inform the mobile station of the set measurement time length.

BEST MODE FOR CARRYING OUT THE INVENTION

Embodiments of the present invention are explained below, referring to drawings.

In the present embodiments, one or a plurality of base station transmits a pilot signal at a predetermined electric power, and the reception quality of each pilot signal transmitted from the one or plurality of base station is periodically measured in one or a plurality of mobile station. One or a plurality of base station with which a link is set up is decided in accordance with a measured result, and one or a plurality of transmission base station is selected from the one or plurality of base station decided.

A characteristic of the present invention is that a predetermined condition deciding a transmission base station such as, for example, a propagation environment or a change in a propagation environment, is changed for each mobile station. Further, a characteristic of the present invention is that transmission base stations are decided so that the number of transmission base stations is as small as possible, and the probability that a base station whose reception quality of a pilot signal in a mobile station is the best is included in transmission base stations becomes high, based upon a predetermined condition.

First, prior to the explanation in detail of an embodiment of the present invention, the present embodiment is explained in principle. Employed is an example of a case where the movement speed of a mobile station is employed as a specific example of a propagation environment or a change in a propagation environment that is an example of a predetermined condition.

When it is supposed that a mean value or the like of the reception levels during a measurement time is employed as a result of the reception quality measurement of the pilot signal in a mobile station, the drift between the reception qualities of the measurement time and the transmission time largely depends upon a fading pitch and a measurement time length changing in accordance with the movement speed.

Figure 1:
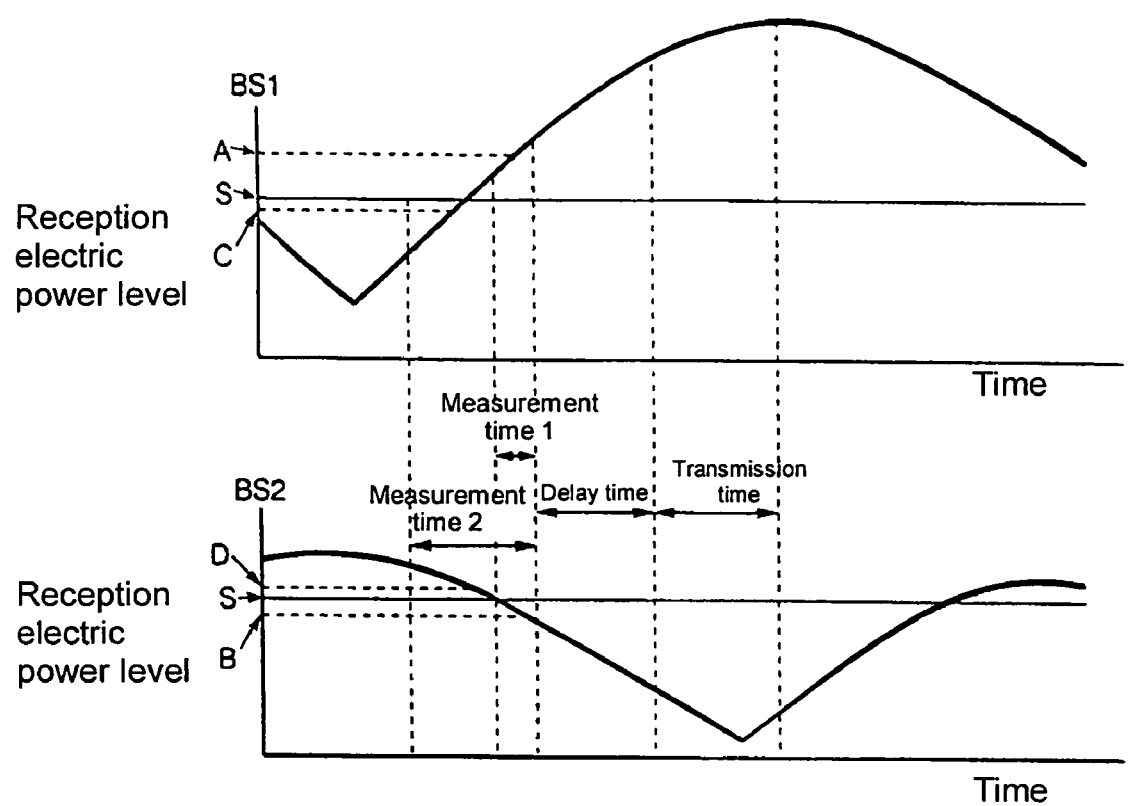
FIG. 1 is characteristic views showing examples of pilot signal reception levels in a mobile station in a case where the movement speed of the mobile station is slow for in principle explaining embodiments of the present invention.
Figure 2:
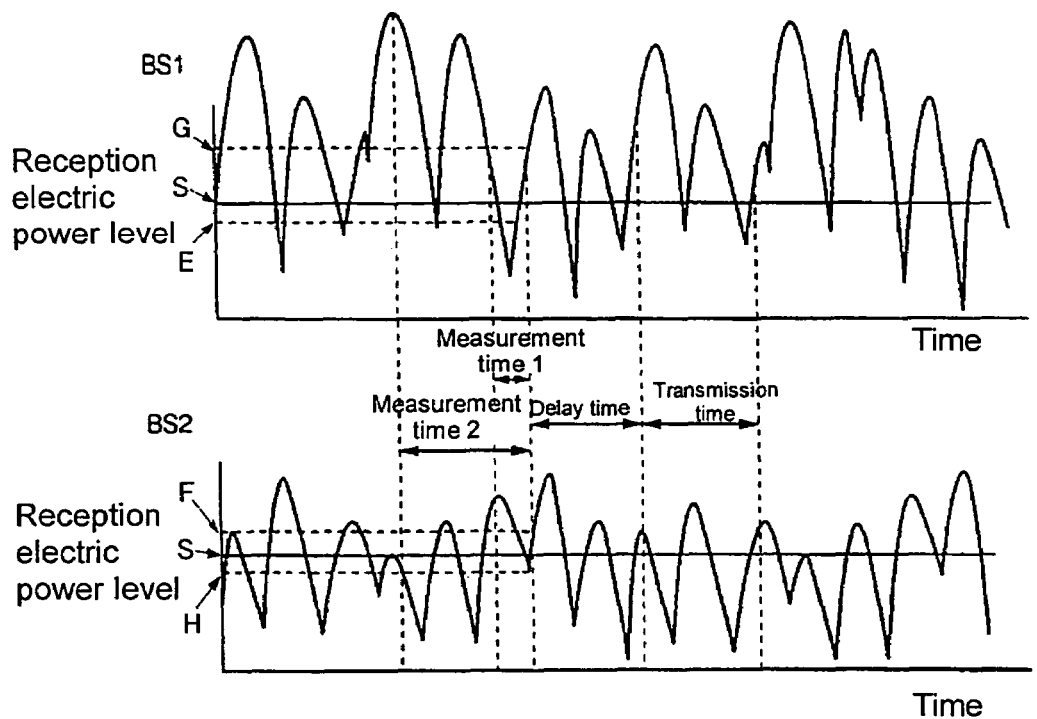
FIG. 2 is characteristic views showing examples of pilot signal reception levels in a mobile station in a case where the movement speed of the mobile station is fast for in principle explaining embodiments of the present invention.

This is explained in detail referring to FIG. 1 and FIG. 2.

FIG. 1 shows an example of reception levels in a mobile station from handover base stations BS1, BS2 of a case where the speed is slow, that is, a case where the fading pitch is small.

In the drawing, shown are a measurement time 1 of a case where the measurement time is short, a measurement time 2 of a case where the measurement time is long, a delay time for deciding a transmission base station from a measurement result of the reception quality and for informing a base station in which a link has been set up, and a transmission time during which transmission is actually implemented from the transmission base station. An electric power level S in the drawing is a standard value for comparing BS1 with BS2, and the sama electric power level value is supposed at BS1 and BS2. In the case of this FIG. 1, in the reception level at a time of actual transmission, BS1 is higher than BS2.

When it is supposed that the value of the reception quality by the measurement is the mean value of the reception levels during the measurement time, in a case where measurements are performed in the measurement time 1, the measurement result of BS1 is reception level A and that of BS2 reception level B. In this case, a base station having the best reception quality is decided as BS1.

However, when the measurements are performed in the measurement time 2, the measurement result of BS1 is reception level C and that of BS2 reception level D, and D is greater than C in this case. Accordingly, the base station having the best reception quality is decided as BS2. Since transmission base stations are selected in the order of good reception quality, the probability that the base station BS1 best at the transmission time is selected as a transmission base station becomes low in this case.

FIG. 2 shows a case where the speed of a mobile station is fast, the reception quality at the actual transmission time shows a case where BS1 is better than BS2 similarly to FIG. 1, and measurement times, a delay time, a transmission time, and a reception level to be a standard are also shown similarly to FIG. 1.

In the case shown in FIG. 2, when measurements are performed in the measurement time 2, the measurement result of BS1 is reception level G and that of BS2 reception level H, and G is greater than H as obvious from the drawing. Accordingly, the base station BS1 having the best reception quality at the transmission time is decided as one having the best reception quality.

However, when measurements are performed in the measurement time 1, the measurement mean of BS1 is reception level E and that of BS2 reception level F, and F is greater than E as obvious from the drawing. Accordingly, a base station having the best reception quality is decided as BS2, and the probability that the base station BS1 best at the transmission time is included in transmission base stations becomes low.

As described above, since the fading pitch is small when the movement speed is slow, when the reception level fluctuation is small, the measurement time is short, and a mean value only for a time as close as possible to the transmission time is employed, the probability that the best base station is included in transmission base stations becomes high. In a case where the movement speed is fast, since the fading pitch is large and the reception level fluctuation is large, when the measurement time is long, and an averaged value of fading is employed, the probability that the best base station is included in transmission base stations becomes high.

However, since the measurement time is constant regardless of speed in the transmission electric power control technique of the conventional base station selection type, there is a problem that the probability that the best base station is included in transmission base stations becomes low.

The relationship between the size of the inner threshold value to be the standard of the time of actually deciding transmission base stations and the movement speed influences the probability that the best transmission base station at the time of transmission is included.

Since a base station within the inner threshold value becomes a transmission base station, the greater the inner threshold value, the higher the probability that the number of transmission base stations becomes large is. Therefore, the probability that the best base station is included in transmission base stations becomes high. However, since the number of links for one mobile station increases when the number of transmission base stations increases, interference of links increases as a whole, and thus the link capacity decreases.

When the speed of a mobile station is slow and the fading pitch is small, since a reception quality fluctuation during the delay time from the measurement of the reception quality to the time a transmission base station actually transmits is small, the difference between the order of good base stations in the reception quality determined from the measurement result and the order of good base stations actually at the time of transmission is small. Accordingly, when the movement speed is slow, even when the inner threshold value is small, the probability that a base station having the best reception quality becomes a transmission base station is large, and the larger the inner threshold value, the more interference increases as a whole since a base station having a poor reception condition comes to be included in transmission base stations.

When the speed of a mobile station is fast and the fading pitch is large, since the reception quality fluctuation during the delay time is large, the difference between the orders of reception qualities of the time of the reception quality measurement and of the time of actual transmission becomes large. Accordingly, when the inner threshold value is small, the probability that a base station having the best reception quality at the time of transmission is not included in transmission base stations becomes high.

As described above, it can be understood that it is better that the inner threshold value is small when the movement speed is slow, and that the faster the movement speed the larger the inner threshold value is.

Although the value of an optimum inner threshold value differs depending upon the speed of a mobile station, an inner threshold value is constant in the transmission electric power control technique of the conventional base station selection type, and deciding transmission base stations under optimum conditions in accordance with the speed is not performed. Thus, the best base station is not included in transmission base stations, or unnecessary transmission base stations increase, and thus there is a problem that interference of links increases and the link capacity decreases.

Therefore, in the present embodiment, by changing the reception quality measurement time length and the inner threshold value of the pilot signal in accordance with the speed of each mobile station, the number of transmission base stations is minimized, the possibility of that the best base station is included is made higher, and downlink capacity is increased. At that time, the faster the movement speed of a mobile station, the longer the measurement time length is taken, and the faster the movement speed of a mobile station, the greater the inner threshold value is taken.

Figure 3:
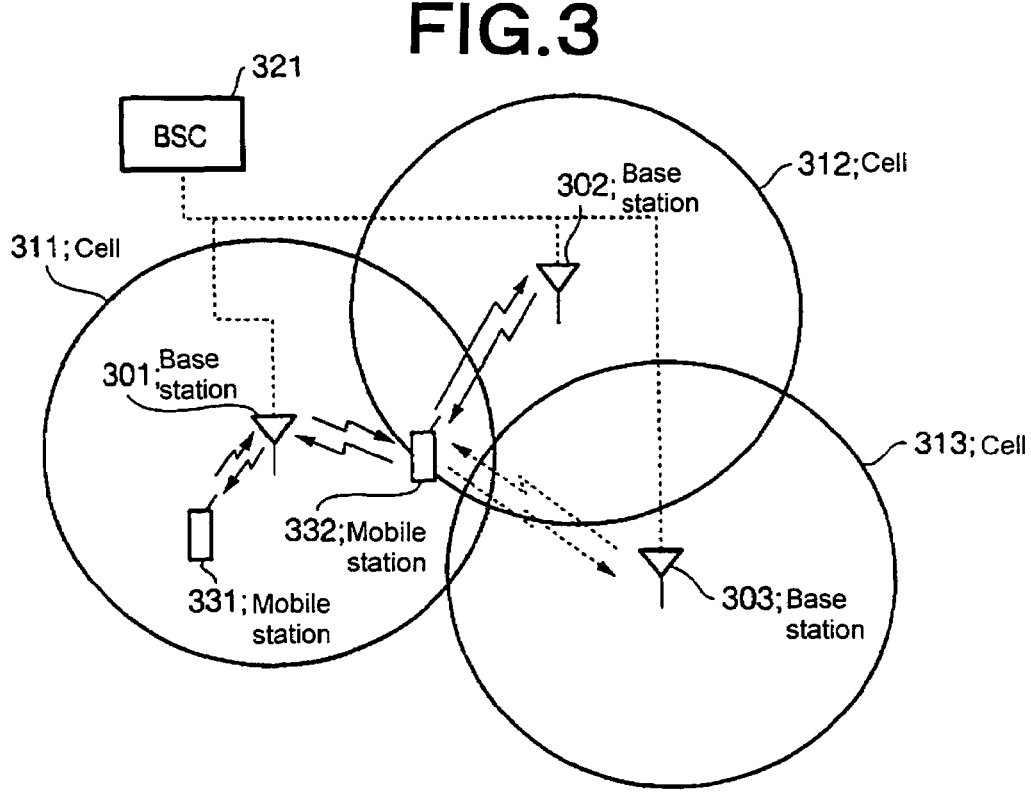
FIG. 3 is a block diagram of a cellular system according to a first embodiment of the present invention.

FIG. 3 is a block diagram of a cellular system to which the present invention is applied.

In FIG. 3, base stations 301 to 303 transmit to mobile stations 331, 332 within regions of respective cells 311 to 313. The respective base stations are connected to a base station controller (BSC) 321. Each of the base stations transmits a predetermined electric power value of pilot signal whose subject is all mobile stations in its cell and an individual signal for each mobile station, and the transmission electric power of the individual signal for each mobile station is controlled by a high speed closed loop type control.

A mobile station periodically measures the reception qualities of the pilot signals transmitted from respective base stations to decide base stations with which links are set up. Links are set up with a base station having the best reception quality and a base station in which the difference between the reception quality thereof and the reception quality of said base station having the best reception quality is within a predetermined threshold value.

With respect to the base station 331 located in a vicinity of the center of the cell 311, since the reception quality from the base station 301 is the best, and since the reception qualities of signals from other cells are not within a predetermined threshold value, the base station 331 sets up a link only with the base station 301 to communicate.

Since the mobile station 332 is located in a vicinity of the boundary of the cell 311, the reception quality from the base station 301 deteriorates by the propagation loss, and the reception qualities of the signals from the base stations 302, 303 are in a state where the differences between the reception quality of the base station 301 and the reception qualities of the base stations 302, 303 are within a predetermined threshold value. Accordingly, at this time the mobile station 332 sets up links with the three base stations 301 to 303. Further, an inner threshold value smaller than said threshold value is set, and a base station whose reception quality is within an inner threshold value is selected as a transmission base station from among the base stations 301 to 303 with which said links are set up to actually transmit. The base stations with which links are set up and which are not transmission base stations switch the transmission electric power to a predetermined minimum value.

When the reception qualities from the base stations 301, 302 are within the inner threshold value, the base stations 301, 302 are selected as transmission base stations, and individual signals are transmitted at an electric power value controlled by the general high speed closed loop control. Since the reception quality of the base station 303 is not within the inner threshold value and is a non-transmission base station, the individual signal is transmitted at a minimum transmission power value.

Figure 4:
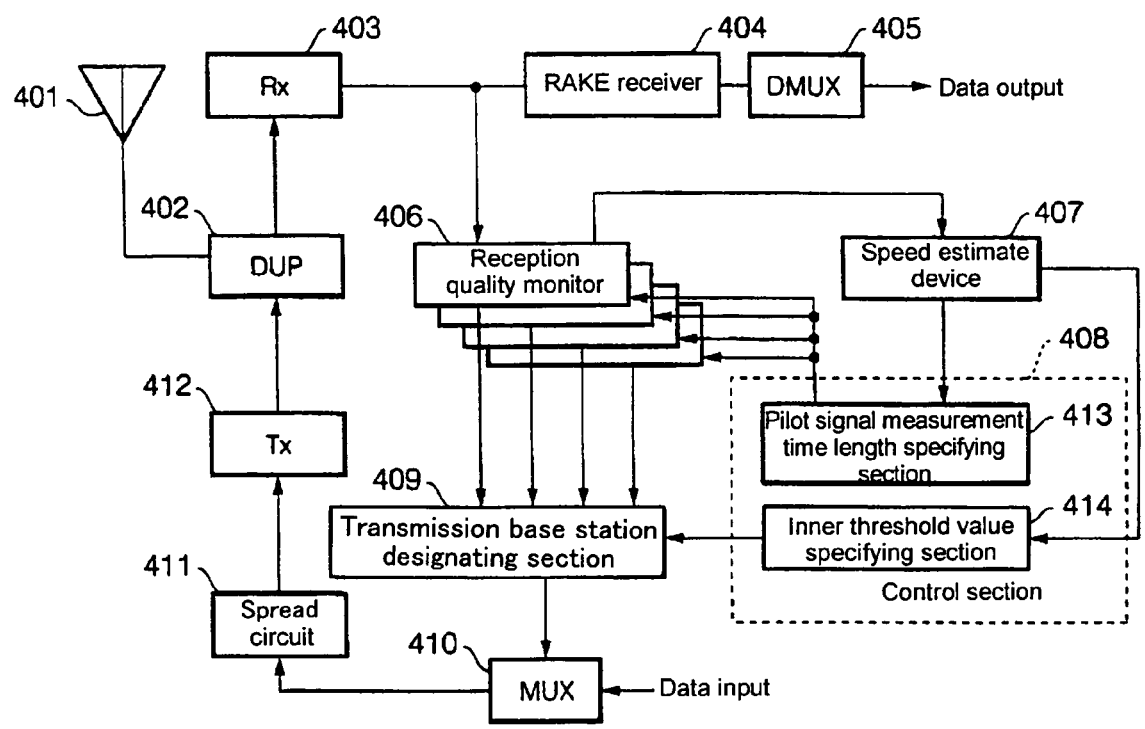
FIG. 4 is a block diagram showing the configuration of a mobile station according to the first embodiment of the present invention.
Figure 5:
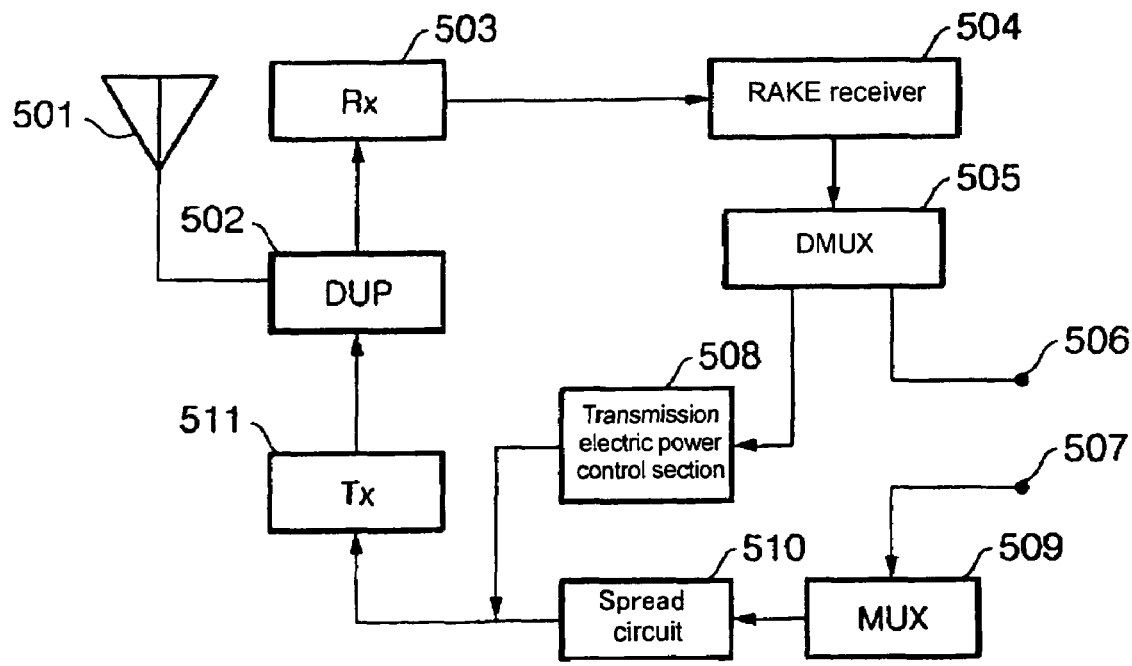
FIG. 5 is a block diagram showing the configuration of a base station according to the first embodiment of the present invention.
Figure 6:
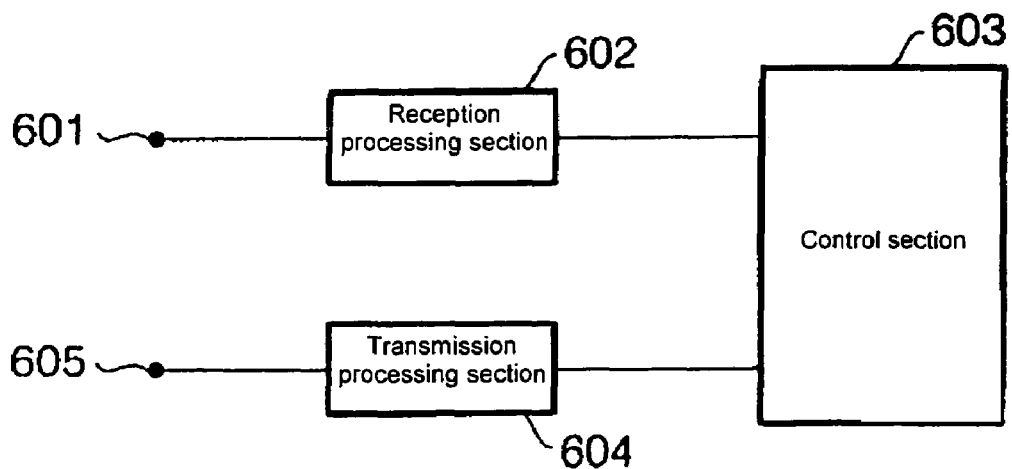
FIG. 6 is a block diagram showing the configuration of a base station controller according to the first embodiment of the present invention.

FIG. 4, FIG. 5, and FIG. 6 show configurations of a mobile station, a base station, and a base station controller according to a first embodiment of the present invention.

In FIG. 4, the mobile station is comprised of a reception antenna 401 receiving a radio signal transmitted from one or a plurality of base stations, a transmission/reception shared device (DUP) 402, a radio reception section (Rx) 403 converting a radio signal into a reception base band signal, a reception quality monitor 406 receiving pilot signals of a plurality of base stations and measuring their reception qualities, a speed estimate device 407 estimating its own station speed from the pilot signals received, a control section 408 controlling in accordance with the estimated speed, a transmission base station designating section 409 deciding and designating transmission base stations through the reception qualities of the pilot signals, a multiplexer (MUX) 410 multiplexing a base station designating signal and input data and generating an up-transmission signal, a spread circuit 411 spreading the up-transmission signal and outputting a transmission base signal, a radio transmission section (Tx) 412 converting the transmission base signal into a radio signal to transmit it, a RAKE receiver 404 synthesizing base signals from a plurality of transmission base stations, and a demultiplexer (DMUX) 405.

The speed estimate device 407 detects a fading pitch from a reception electric field strength of a received signal and from this detection result estimates its own station movement speed.

The control section 408 is comprised of a pilot signal measurement time length specifying section 413 and an inner threshold value specifying section 414, and each of these specifies a value corresponding to the estimated speed.

The reception quality monitor 406 measures the reception levels of the pilot signals transmitted from base stations only for a time length specified through the pilot signal measurement time length specifying section 413 and informs the transmission base station designating section 409 of its results.

The transmission base station designating section 409 designates a base station group whose reception quality differences are within the threshold value as base stations with which links are set up through the measurement results of the reception levels and selects a transmission base station actually transmitting from among the base station group with which links are set up. The transmission base station is supposed to be a base station whose reception quality difference is within the inner threshold value which is smaller than the threshold value of the time when a link is set up. Specifically, a base station whose reception quality is the best and a base station in which the difference between the reception quality of the base station and the reception quality of itself is within a threshold value specified by the inner threshold value specifying section are decided as transmission base stations so that a signal designating transmission base stations is generated. This transmission base station designating signal is transmitted to one or a plurality of base stations with which links are set up.

In FIG. 5, a base station is comprised of a reception antenna 501 receiving a radio signal transmitted from a mobile station, a transmission/reception shared device (DUP) 502, a radio reception section (Rx) 503 converting a radio signal into a reception base band signal, a RAKE receiver 504 synthesizing a base signal, a demultiplexer (DMUX) 505, an output terminal 506 transmitting a signal separated by a demultiplexer to the base station controller, an input terminal 507 inputting a control signal from the base station controller, a transmission electric power control section 508 controlling the transmission electric power of its own station in accordance with the transmission base station designating signal separated by the demultiplexer, a multiplexer (MUX) 509, a spread circuit 510 outputting the transmission base signal, and a radio transmission section (Tx) 511 converting the transmission base signal into a radio signal to transmit.

The transmission electric power control section 508 transmits at a transmission power value according to a general high speed closed loop transmission electric power control when its own station is a transmission base station in accordance with the transmission base station designating signal transmitted from a mobile station and switches the transmission electric power to a predetermined minimum transmission power value when its own station is not a transmission base station.

In FIG. 6, the base station controller is comprised of an input terminal 601 receiving a signal transmitted from the base station, a reception processing section 602, a control section 603 performing various controls regarding transmission and reception of a base station, a transmission processing section 604, and an output terminal 605 transmitting a signal to each base station.

Figure 7:
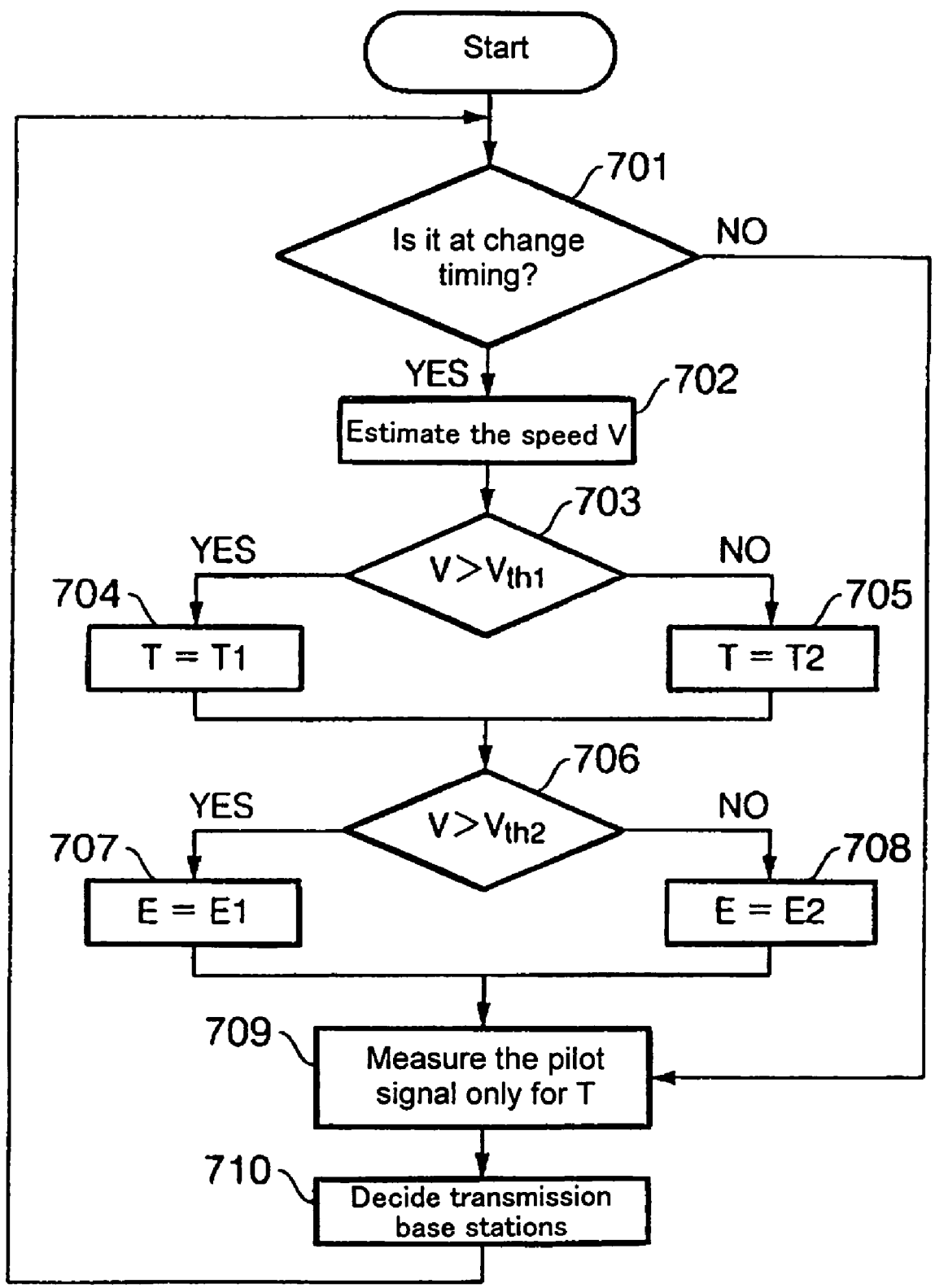
FIG. 7 is a flow chart showing operations of the mobile station according to the first embodiment of the present invention.

FIG. 7 is a flow chart showing operations of the mobile station according to the first embodiment of the present invention. Changes of the pilot signal measurement time length and the inner threshold value performed for each predetermined time during operations of change of a transmission base station that the mobile station periodically performs is explained below.

First, when it is at change timing of the pilot signal measurement time length and the inner threshold value performed for each predetermined time (step 701, YES), the fading pitch is measured through a pilot signal reception level from a measured base station and estimates a movement speed V of its own station (step 702).

When this estimated speed V is greater than a speed Vth1 (step 703, YES), a pilot signal measurement time length T is set as a predetermined value T1 (step 704), and when the estimated speed V is smaller than the speed Vth1 (step 703, NO), the pilot signal measurement length T is altered to T2 (step 705). In this case, T1 is greater than T2. When the estimated speed V is greater than a speed Vth2 (step 706, YES), an inner threshold value E is set as a predetermined value E1 (step 707), and when the estimated speed V is smaller than the speed Vth2 (step 706, NO), the inner threshold value E is altered to E2 (step 708). In this case, E1 is greater than E2.

If it is not at the change timing of the measurement time length and the inner threshold value (step 701, NO), the measurement time length and the inner threshold value are not altered.

The reception quality of the pilot signal is measured only for the measurement time length T (step 709).

Among a base station having the best reception quality in the measured base station group and base stations in which the differences in the reception qualities of the base station having the best reception quality and of said base stations are within a set inner threshold value E, base stations are decided as transmission base stations up to a predetermined maximum number of transmission base stations in the order of good reception qualities, and a signal designating transmission base stations is transmitted (step 710).

Such change of transmission base stations is periodically performed while the mobile station is performing the handover.

Next, entire operation of the present embodiment is explained.

Operations forming a basis of the present embodiment are two, that is, a change in the measurement time length of the pilot signal corresponding to the speed of a mobile station and a change in the inner threshold value.

The optimum pilot measurement time length differs according to the movement speed of a mobile station. When the movement speed is slow, the reception level fluctuation during the delay time until transmission is actually performed is small.

Thus, in the present embodiment, when the movement speed is slow, the pilot measurement time length is set short, and a mean value only for a time period close to the transmission time is employed. Therefore, the difference in the reception qualities of transmission times can be made small, and the probability that the best base station is included as a transmission base station can be made higher.

When the movement speed is fast, the reception level fluctuation during the delay time until transmission is actually performed is large, and a measurement mean in a short time period becomes a mean only for a part of a moment value, whereby the difference between said mean and an average reception level in the transmission time period becomes large.

Thus, in the present embodiment, when the movement speed is fast, the pilot measurement time length is made longer, and a value obtained by averaging fading fluctuation is employed, whereby the probability that a base station that is best at the transmission time is included in transmission base stations can be made higher.

The greater the inner threshold value, the higher the probability that the number of transmission base stations becomes large, and thus the probability that the best base station is included in transmission base stations becomes high. However, when the number of transmission base stations increases, since the number of transmission signals for one mobile station increases, interference as a whole increases.

Thus, in the present embodiment, when the speed is slow and the reception level fluctuation is small, that is, when the difference between the measured result and an actual one in the transmission time is not easily manifested, by specifying a small inner threshold value, unnecessary transmission base stations can be decreased without deteriorating the probability that a base station having the best reception quality is included in transmission base stations.

By specifying a greater inner threshold value when the speed is fast, even when the reception level fluctuation is large and the difference between the measured result and an actual one in the transmission time is easily manifested, the probability that a base station having the best reception quality is included in transmission base stations can be made higher.

Thus, in the present embodiment, since transmission base stations are decided by conditions corresponding to each movement speed so that the number of transmission base stations is decreased and the probability that a base station having the best reception quality in the transmission time is included in transmission base stations is made higher, interference of links is reduced, and link capacity can be increased.

Next, a second embodiment of the present invention is explained.

Figure 8:
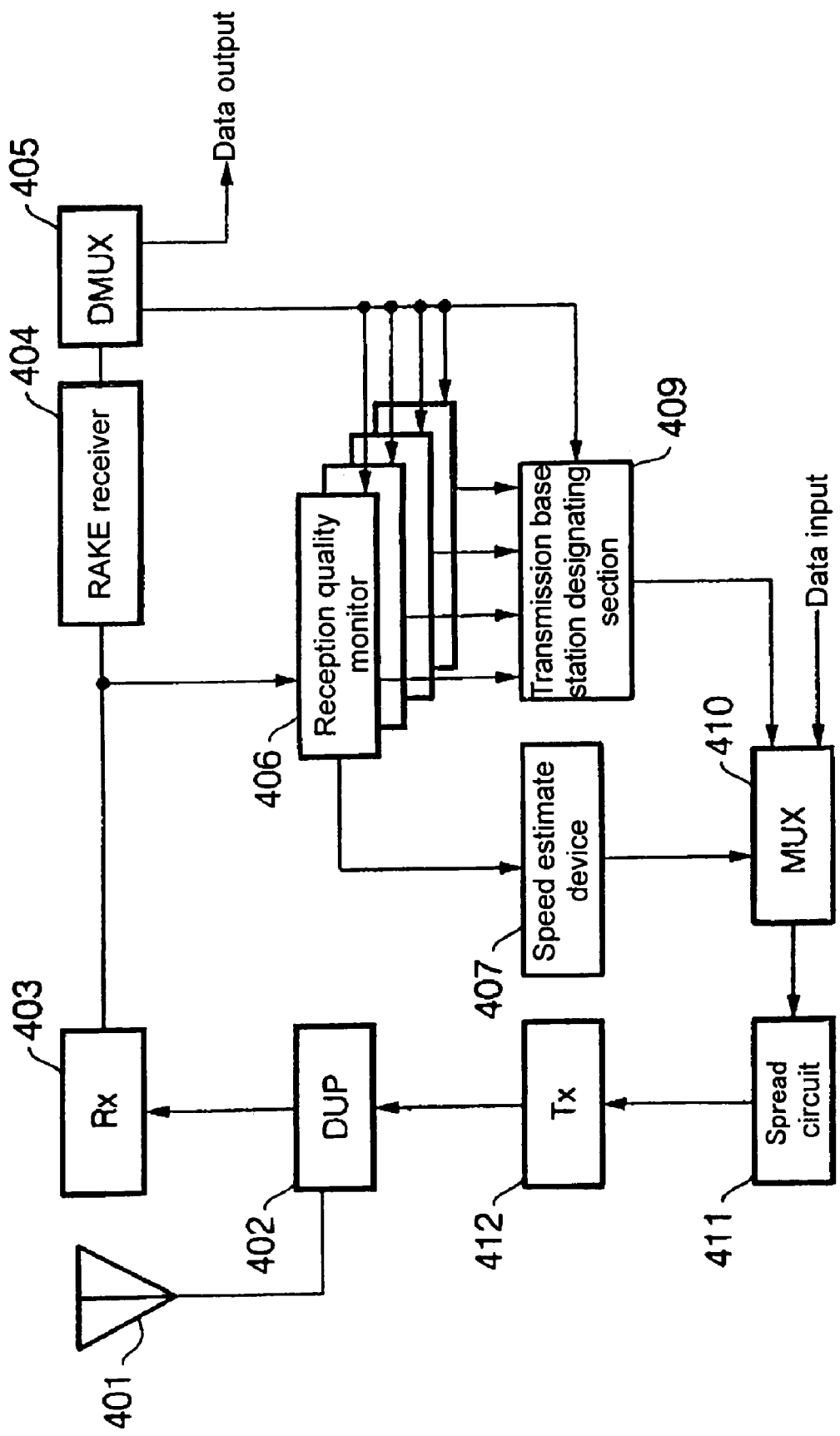
FIG. 8 is a block diagram showing the configuration of a mobile station according to a second embodiment of the present invention.
Figure 9:
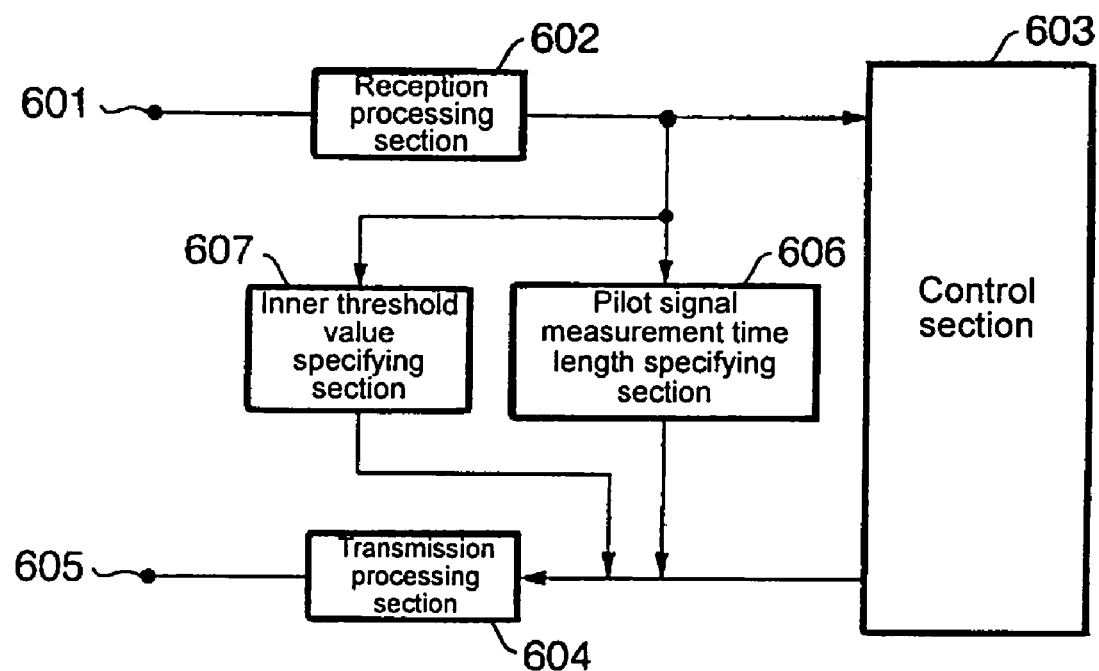
FIG. 9 is a block diagram showing the configuration of a base station controller according to the second embodiment of the present invention.

FIG. 8 and FIG. 9 are diagrams showing configurations of a mobile station and a base station controller according to the present embodiment, the same reference numerals are designated for the corresponding parts to those in FIG. 4 and FIG. 6, and overlapping explanation thereof is omitted.

The base station according to the present embodiment is the same as that of the first embodiment of FIG. 4. The cellular system to which the present embodiment is applied is the same as that of FIG. 3.

In FIG. 8, the mobile station according to the present embodiment is not provided with the control section 408 with which the mobile station of FIG. 4 is provided. In compensation therefor, a signal representing the speed of the mobile station estimated by the speed estimate device 407 at predetermined time intervals is outputted to the multiplexer (MUX) 410, is multiplexed onto the transmission signal, and is transmitted to the base station.

Signals specifying the pilot signal measurement time length and the inner threshold value which are multiplexed onto the transmission signal from the transmission base station are separated in the demultiplexer (DMUX) 405 so as to inform the reception quality monitor 406 of the pilot signal measurement time length and the transmission base station designating section 409 of the inner threshold value. Operations of other components of FIG. 8 are performed similarly to those of the mobile station of FIG. 4.

The base station controller according to the present embodiment is provided with a pilot signal measurement time length specifying section 606 and an inner threshold value specifying section 607 with which the base station controller of FIG. 6 is not provided as shown in FIG. 9.

The base station controller separates a signal representing the movement speed of the mobile station which is multiplexed at predetermined time intervals onto the signal transmitted from the mobile station and informs the pilot signal measurement time length specifying section 606 and the inner threshold value specifying section 607 of its estimated speed. The pilot signal measurement time length specifying section 606 and the inner threshold value specifying section 607 decide a reception quality measurement time length of a pilot signal and an inner threshold value corresponding to the estimated speed, multiplex signals specifying the respective length and value onto the transmission signal, and inform the mobile station via the transmission base station from the transmission processing section 604. Operations of other components of FIG. 9 are performed similarly to those of the base station controller of FIG. 6.

Figure 10:
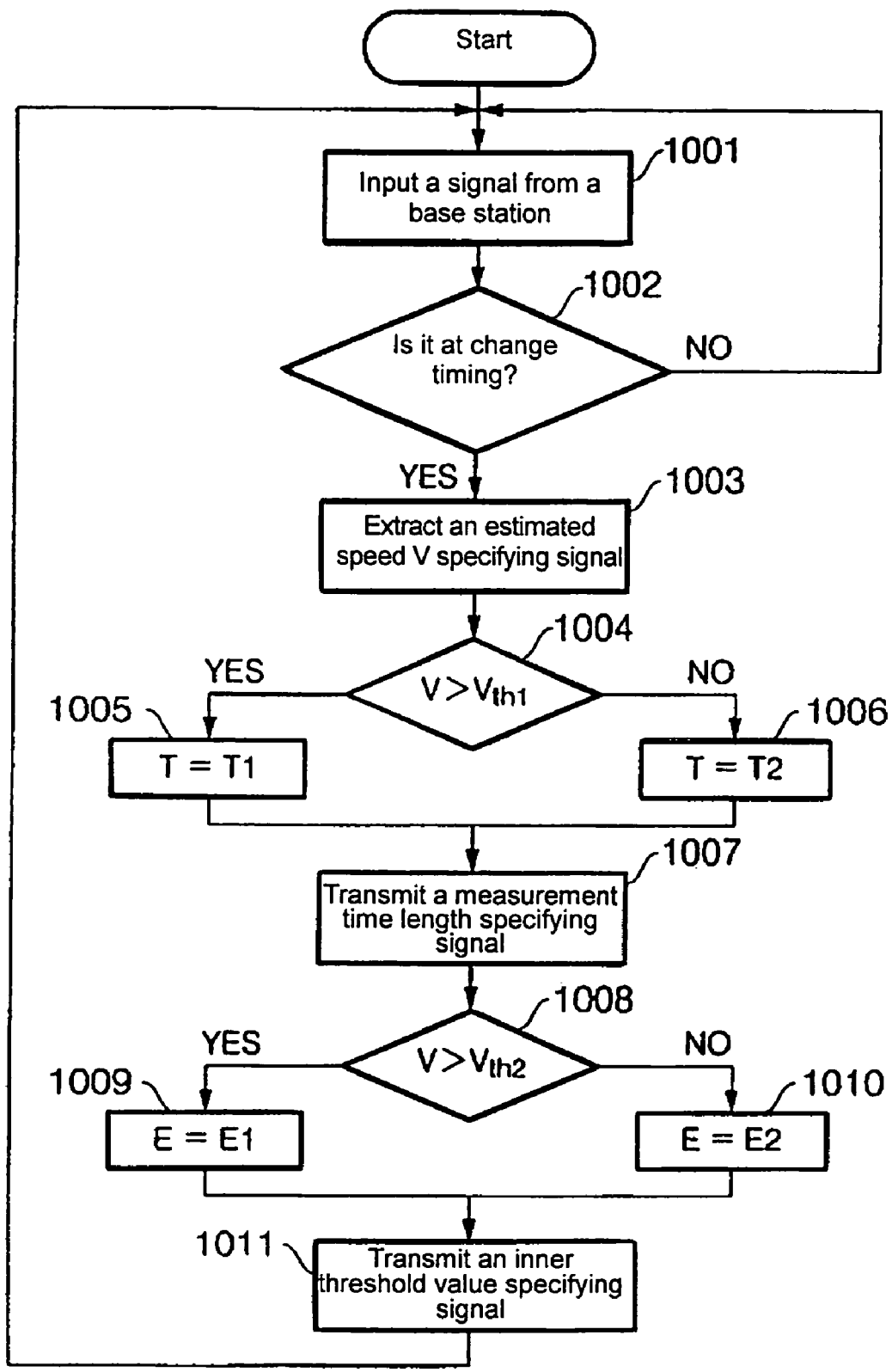
FIG. 10 is a flow chart showing operations of the base station controller according to the second embodiment of the present invention.

FIG. 10 is a flow chart showing operations of the base station controller of the present embodiment. Control for specifying changes of the pilot signal measurement time length and the inner threshold value performed at predetermined time intervals is explained below.

First, the base station controller receives the transmission signal from the mobile station via the transmission base station (step 1001). When it is at change timing of the pilot signal measurement time length and the inner threshold value (step 1002, YES), a signal informing of the movement speed V estimated in the mobile station is multiplexed onto the transmission signal from the mobile station, and the base station controller separates the signal (step 1003).

When the estimated speed V informed is greater than a predetermined value Vth1 (step 104, YES), a measurement time length T of the pilot signal is specified as T1 (step 1005), and when the estimated speed V is smaller than the speed Vth1 (step 104, NO), a signal specifying the pilot signal measurement length T as T2 (step 1006) is transmitted to the mobile station via the transmission base station (step 1007). Here, T1 is greater than T2.

When the estimated speed V is greater than a predetermined value Vth2 (step 1008, YES), the inner threshold value is specified as E1 (step 1009), and when the estimated speed V is smaller than that (step 1008, NO), a signal specifying the inner threshold value as E2 (step 1010) is transmitted to the mobile station via the transmission base station (step 1011). Here, E1 is greater than E2.

If it is not at the change timing of the pilot signal measurement time length and the inner threshold value (step 1002, NO), the pilot signal measurement time length and the inner threshold value are not altered.

The base station controller periodically performs the above described operations while the mobile station is performing the soft handover.

As clear from the above, the difference between the first embodiment and the second embodiment is that although in the case of the first embodiment, the pilot signal measurement time length and the inner threshold value are decided in the mobile station side corresponding to the movement speed of its own station estimated in the mobile station, in the case of the second embodiment, the mobile station multiplexes the signal representing the estimated movement speed onto the transmission signal and informs the base station controller via the base station of it, and the measurement time length of the pilot signal and the inner threshold value are decided corresponding to the informed estimated speed in the base station controller side and the mobile station is informed of them.

The operations of the second embodiment are substantially the same as those of the first embodiment. When the speed is slow and the reception level fluctuation is small, a short pilot signal measurement time length is specified, and a mean value only for a time as close as possible to the actual transmission time is employed. When the speed is fast and the reception level fluctuation is large, a long pilot signal measurement time length is specified, and an averaged value of fading fluctuation is employed. Thus, the difference in the reception levels of the reception time and of the transmission time can be made smaller, and therefore the probability that the base station having the best reception quality is included in transmission base stations can be made higher.

A small inner threshold value is specified when the difference between the reception result and an actual one in the transmission time is small due to a slow speed and a small reception level fluctuation, and a large inner threshold value is specified when the difference between the reception result and an actual one in the transmission time is large due to a fast speed and a large reception level fluctuation. Thus, unnecessary transmission base stations can be decreased while the probability that a base station having the best reception level is included in transmission base stations is made higher.

Next, a third embodiment is explained. Although the pilot signal measurement time length and the inner threshold value are decided corresponding to the movement speed of the mobile station itself estimated in the mobile station in the cases of the first and second embodiments, in the third embodiment, the movement speed of the mobile station is estimated in the base station. Thus, the base station is provided with a speed estimate device, and the movement speed of the mobile station is estimated from a change or the like of a transmission electric power control signal periodically transmitted to the base station with which a link is set up from the mobile station.

When the movement speed of the mobile station is estimated in the base station, the base station informs the mobile station in which the movement speed is estimated of an estimated result. In the mobile station, similarly to the first embodiment, the measurement time length of the pilot signal and the inner threshold value may be decided employing the movement speed estimated in this base station.

Figure 11:
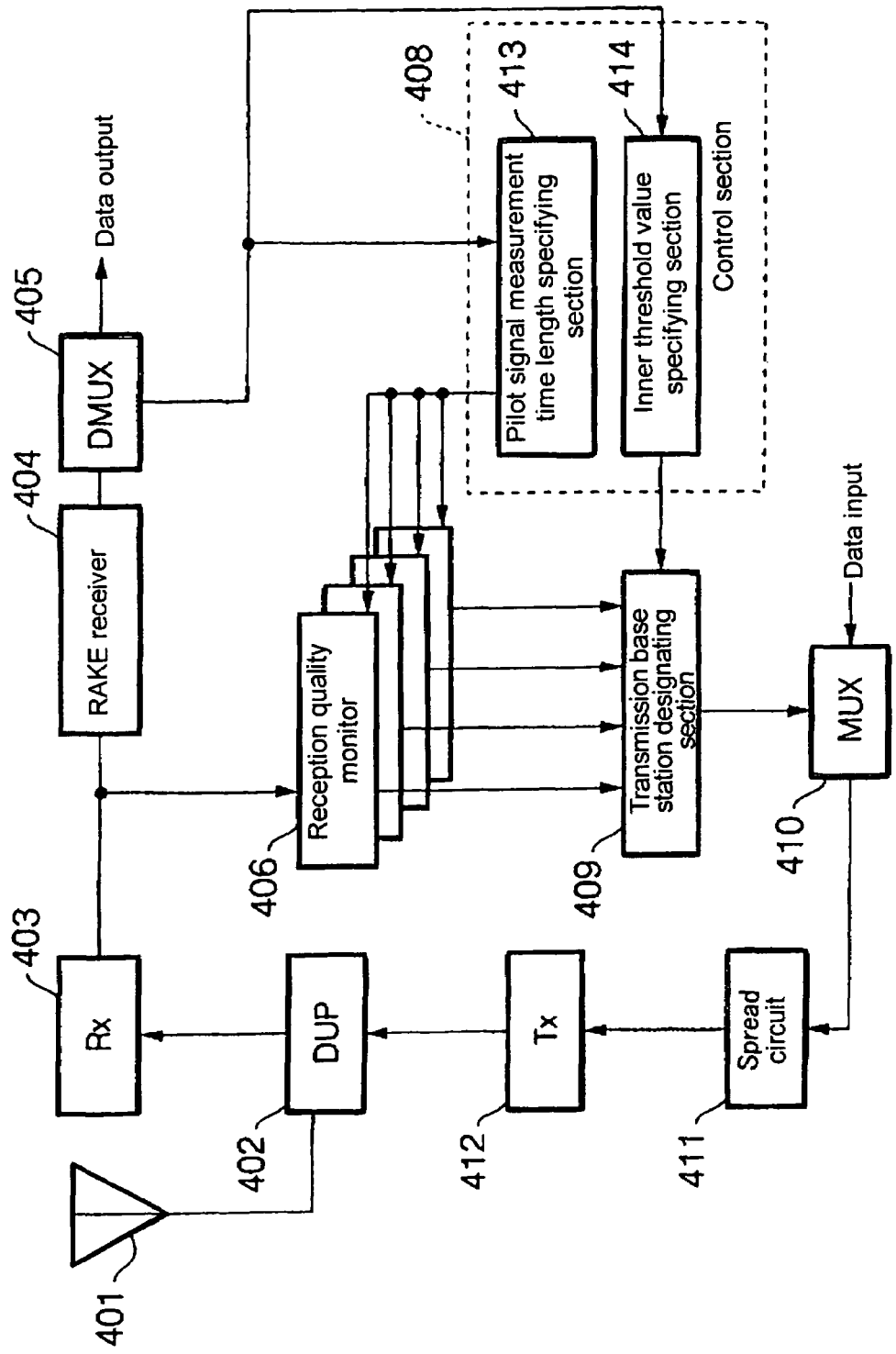
FIG. 11 is a block diagram showing the configuration of a mobile station according to a third embodiment of the present invention.
Figure 12:
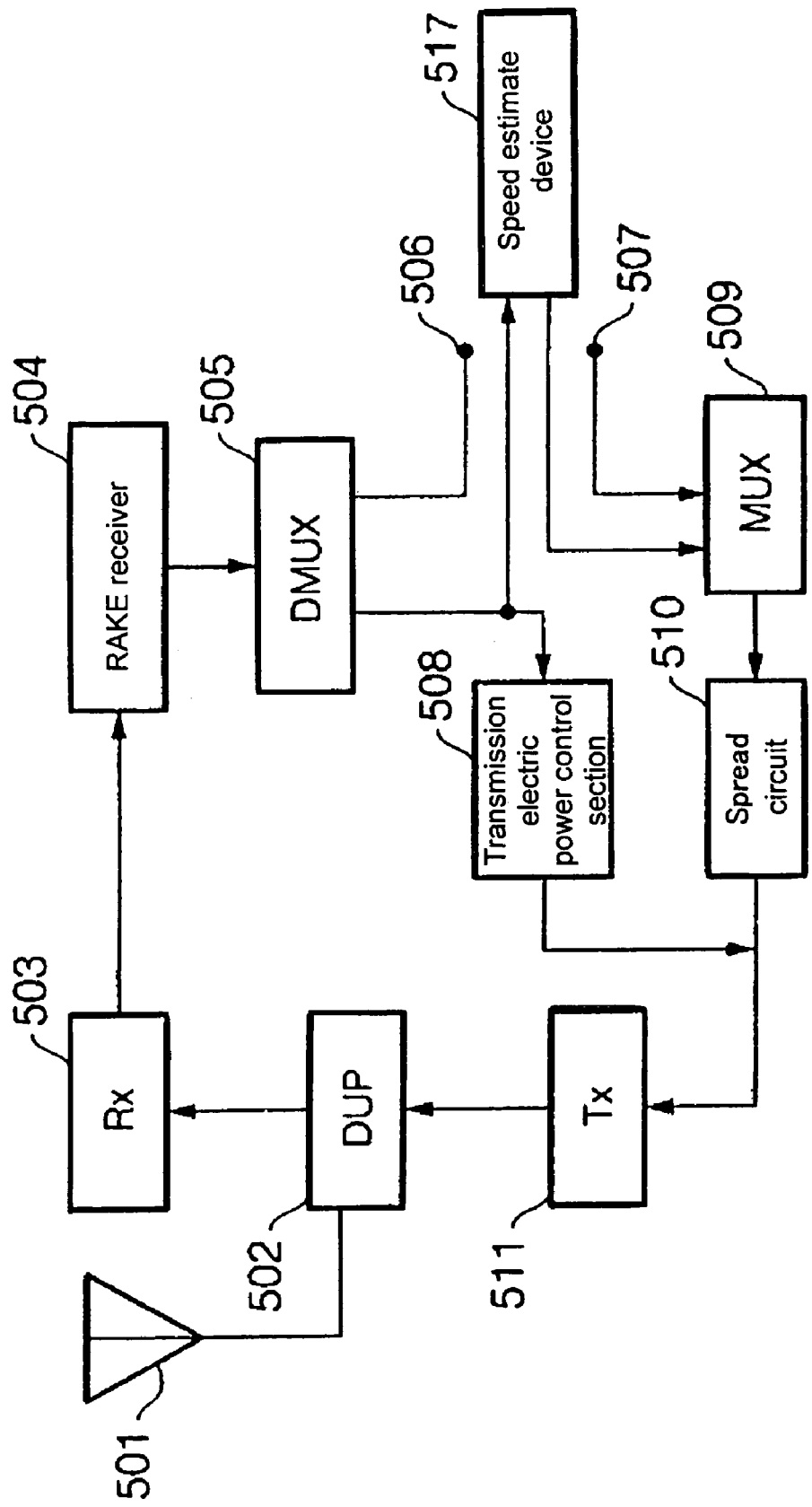
FIG. 12 is a block diagram showing the configuration of a base station according to the third embodiment of the present invention.

FIG. 11 and FIG. 12 show configurations of the mobile station and the base station according to the third embodiment of the present invention. The base station controller may have a configuration similar to that of FIG. 6 of the first embodiment.

In FIG. 11, the mobile station according to the present embodiment is not provided with the speed estimate device 407 with which the mobile station is provided in FIG. 4. In compensation therefor, a signal representing the speed of the mobile station multiplexed onto the transmission signal from a transmission base station is separated in the demultiplexer (DMUX) 405 and is inputted to the pilot signal measurement time specifying section 413 and the inner threshold value specifying section 414 of the control section 408.

Since operations of the control section 408 and operations of other components are similar to those of the first embodiment, explanation thereof is omitted.

In operations of the mobile station in the present embodiment, a signal representing the speed of the mobile station from the base station may be received at step 702 of FIG. 7 that is a flow chart showing operations of the first embodiment, and the pilot signal measurement time length and the inner threshold value may be decided at steps 703, 706 based upon that speed V In FIG. 12, the base station according to the present embodiment is further provided with a speed estimate device 517 in the base station shown in FIG. 5. The speed estimate device 517 inputs the transmission electric power control signal multiplexed onto the transmission signal from the mobile station separated in the demultiplexer (DMUX) 505 and estimates the movement speed of the mobile station based upon the change in the transmission electric power control signal. The signal representing the speed of the mobile station estimated by the speed estimate device 517 is outputted to the multiplexer (MUX) 509, is multiplexed onto the transmission signal, and is transmitted to the corresponding mobile station.

Since other operations in the base station are similar to those of the first embodiment, they are omitted.

Next, a forth embodiment is explained. In the third embodiment, the movement speed of the mobile station is estimated in the base station, and the corresponding mobile station is informed of the estimated movement speed. In the forth embodiment, the base station controller is informed of the movement speed of the mobile station estimated in the mobile station, the pilot signal measurement time length and the inner threshold value are decided in the base station controller similarly to the second embodiment, and the corresponding mobile station is informed of them via the base station. The mobile station alters the pilot signal measurement time length and the inner threshold value based upon the information from the base station controller.

Figure 13:
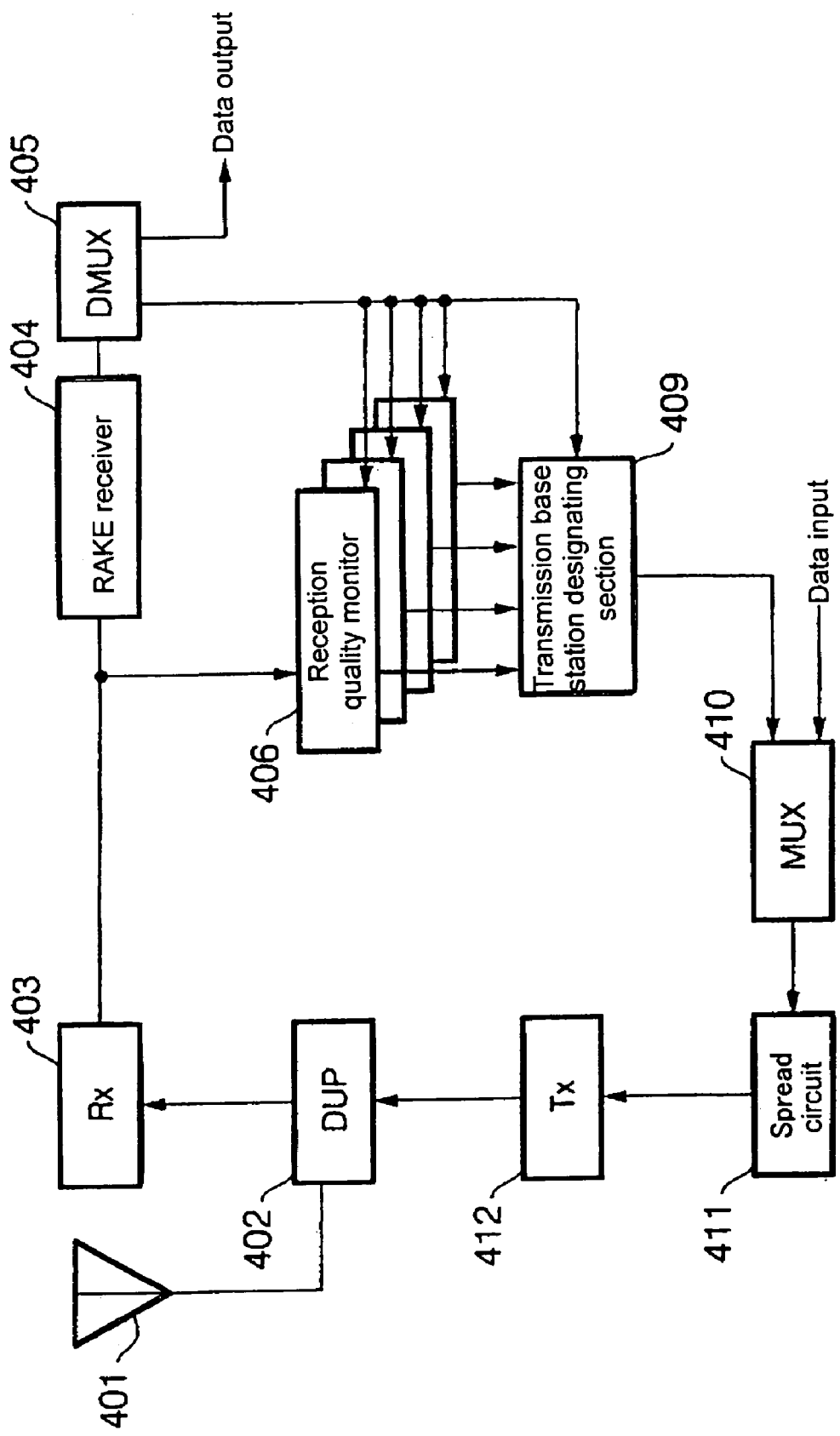
FIG. 13 is a block diagram showing the configuration of a mobile station according to a fourth embodiment of the present invention.
Figure 14:
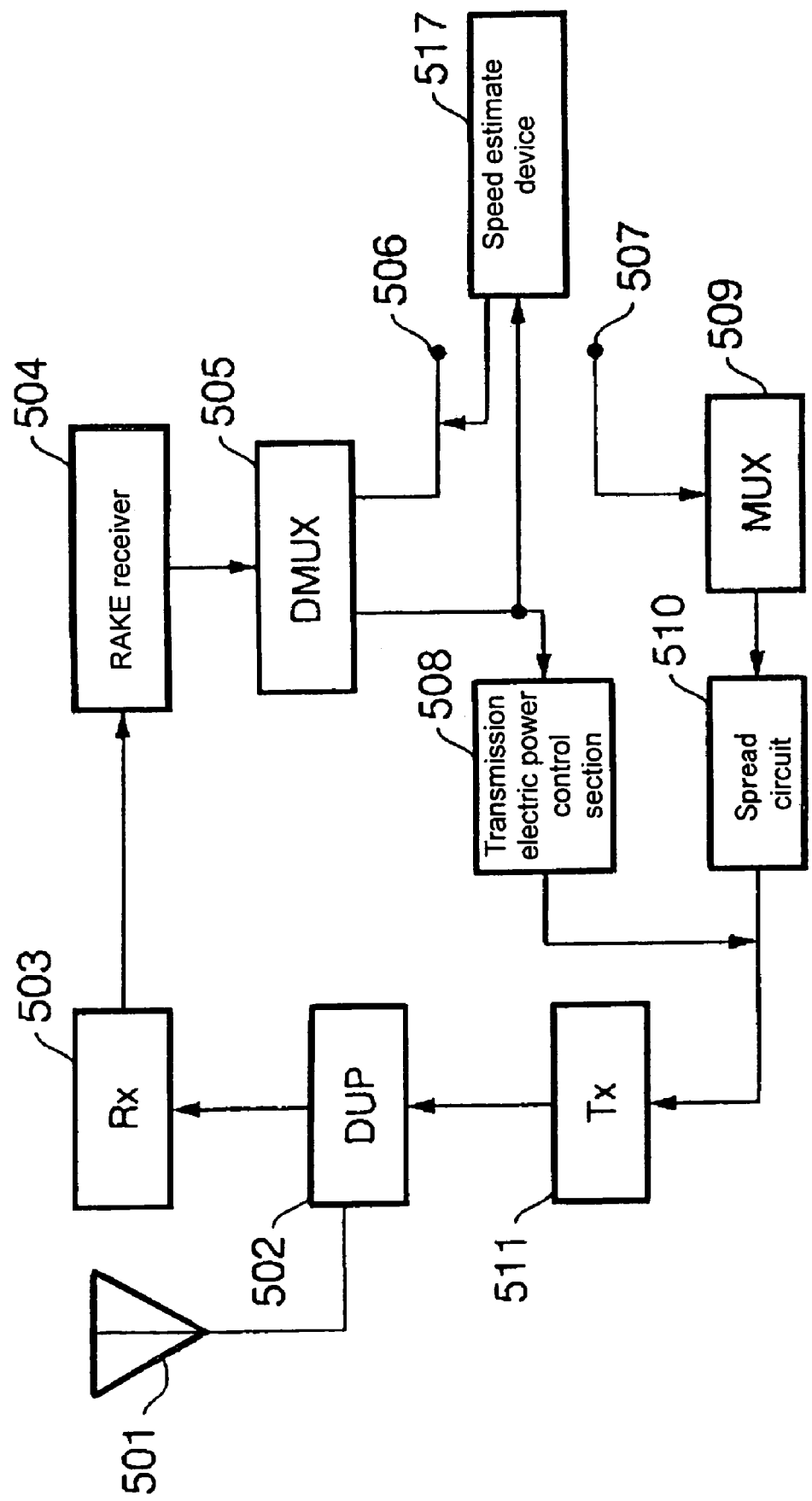
FIG. 14 is a block diagram showing the configuration of a base station according to the fourth embodiment of the present invention.

FIG. 13 and FIG. 14 are diagrams showing configurations of a mobile station and a base station according to the fourth embodiment of the present invention, the same reference numerals are designated for the corresponding parts to those in FIG. 8 and FIG. 5, and overlapping explanation thereof is omitted. The base station controller according to the present embodiment is the same as that of the second embodiment of FIG. 9. The cellular system to which the present embodiment is applied is the same as that of FIG. 3.

In FIG. 13, the mobile station according to the present embodiment is not provided with the speed estimate device 407 with which the mobile station is provided in FIG. 8. In compensation therefor, a signal specifying the pilot signal measurement time length and the inner threshold value multiplexed onto the transmission signal from a transmission base station is separated in the demultiplexer (DMUX) 405, and the reception quality monitor 406 is informed of the pilot signal measurement time length and the transmission base station designating section 409 is informed of the inner threshold value. The multiplexer (MUX) 410 multiplexes the base station designating signal from the transmission base station designating section 409 onto input data to generate an up-transmission signal. Since operations of other components are similar to those of the second embodiment, explanation thereof is omitted.

In FIG. 14, the base station according to the present embodiment is further provided with the speed estimate device 517 in the base station shown in FIG. 5. The speed estimate device 517 inputs the transmission electric power control signal multiplexed onto the transmission signal from the mobile station separated in the demultiplexer (DMUX) 505 and estimates the movement speed of the mobile station based upon the change in the transmission electric power control signal. This estimation is performed for each mobile station with which a link is set up. The signal representing the speed of a mobile station estimated by the speed estimate device 517 is outputted to the output terminal 506, and the base station controller is informed of that signal.

Since other operations in the base station are similar to those of the first embodiment, they are omitted.

Since the configuration and operations of the base station controller are similar to those of the second embodiment, their explanation is omitted.

Next, a fifth embodiment of the present invention is explained. Although the pilot signal measurement time length and the inner threshold value are decided in the base station controller corresponding to the movement speed of the mobile station estimated in the mobile station in the cases of the second embodiment, in the fifth embodiment, the pilot signal measurement time length and the inner threshold value are decided in the base station, and the corresponding mobile station is informed of them.

In the mobile station, the pilot signal measurement time length and the inner threshold value are altered based upon the information from the base station.

Figure 15:
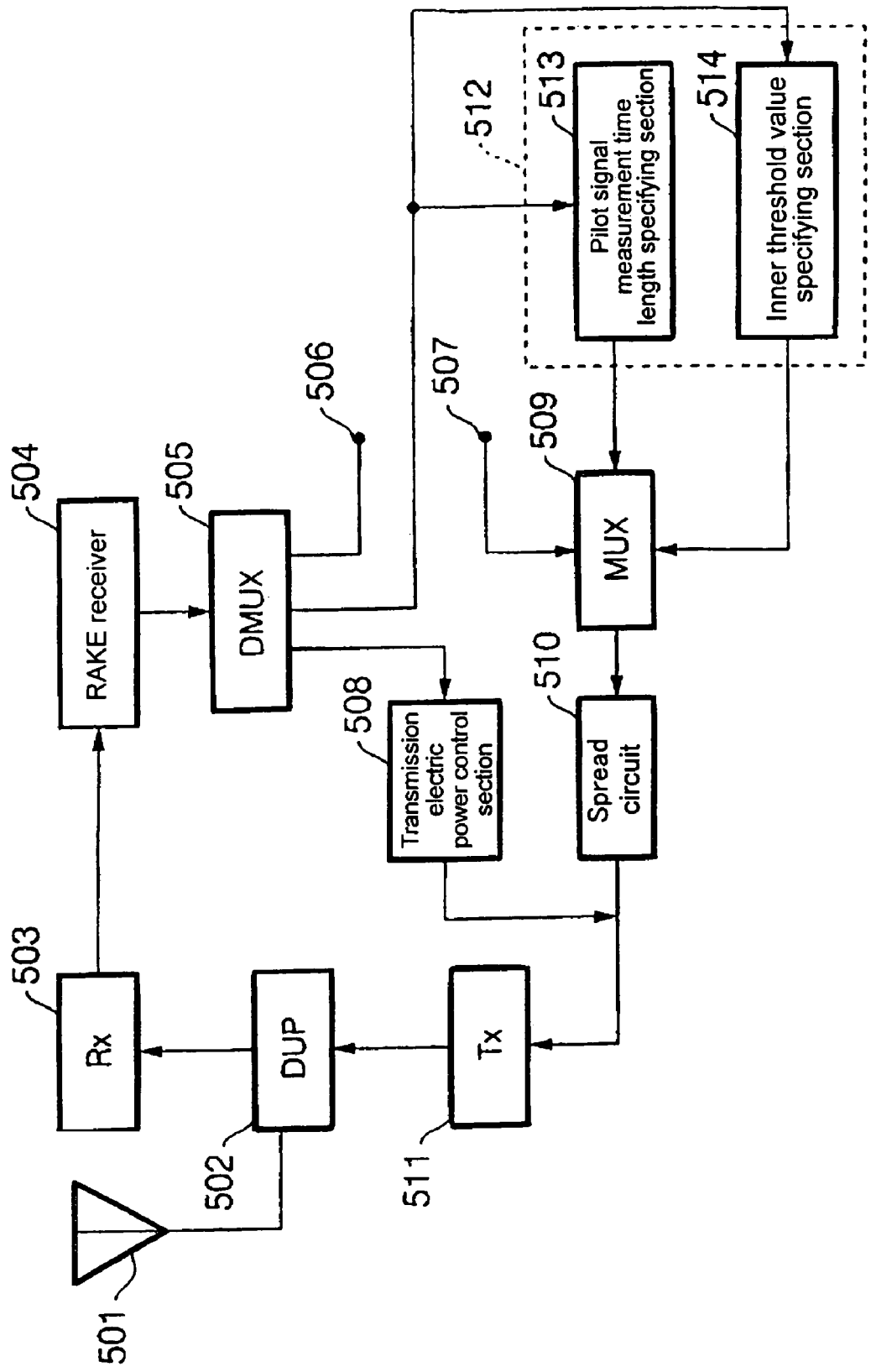
FIG. 15 is a block diagram showing the configuration of a base station according to a fifth embodiment of the present invention.

FIG. 15 is a diagram showing the configuration of the base station according to the present embodiment, the same reference numerals are designated for the corresponding parts to those in FIG. 5, and overlapping explanation thereof is omitted. The mobile station according to the present embodiment is the same as that of the second embodiment of FIG. 8. The cellular system to which the present embodiment is applied is the same as that of FIG. 3.

In FIG. 15, the base station according to the present embodiment is provided with a control section 512 comprised of a pilot signal measurement time length specifying section 513 and an inner threshold value specifying section 514 with which the base station controller of FIG. 6 is not provided.

The base station separates a signal representing the movement speed of the mobile station multiplexed at predetermined time intervals onto the signal transmitted from the mobile station in the demultiplexer (DMUX) 505 and informs the pilot signal measurement time length specifying section 513 and the inner threshold value specifying section 514 of the estimated speed. The reception quality measurement time length of the pilot signal and the inner threshold value are decided corresponding to the estimated speed in the pilot signal measurement time length specifying section 513 and the inner threshold value specifying section 514, and signals specifying the length and the value are multiplexed onto the transmission signal in the multiplexer (MUX) 509 and are processed in the spread circuit 510, the radio transmission section (Tx) 511, and the transmission/reception shared device (DUP) 502 to be transmitted from the reception antenna 501 to the mobile station. Operations of other components are performed similarly to those of the base station of FIG. 5.

In operations of the base station in the present embodiment, a signal representing the speed of the mobile station from the base station may be received at step 1001 of FIG. 10 that is the flow chart showing the operations of the base station controller of the second embodiment, and based upon this speed V the pilot signal measurement time length and the inner threshold value may be decided at steps 1003, 1007 so that the mobile station is informed of them.

Although in the second embodiment, the mobile station receives the pilot signal measurement time length and the inner threshold value decided in the base station controller via the base station so as to alter the pilot signal measurement time length and the inner threshold value, it is only different therefrom in the present embodiment that the mobile station directly receives the pilot signal measurement time length and the inner threshold value decided in the base station. Thus, since the mobile station in the present embodiment can be realized by the same configuration as that of the mobile station of the second embodiment shown in FIG. 8, its explanation is omitted.

Next, a sixth embodiment is explained. Although the pilot signal measurement time length and the inner threshold value are decided in the base station corresponding to the movement speed of the mobile station estimated in the mobile station in the case of the fifth embodiment so as to inform the corresponding mobile station of them, in the sixth embodiment, a movement speed is estimated in the base station for each mobile station, and corresponding to the estimated movement speed, the pilot signal measurement time length and the inner threshold value are decided in the base station, and the corresponding mobile station is informed of them.

In the mobile station, the pilot signal measurement time length and the inner threshold value are altered based upon the information from the base station.

Figure 16:
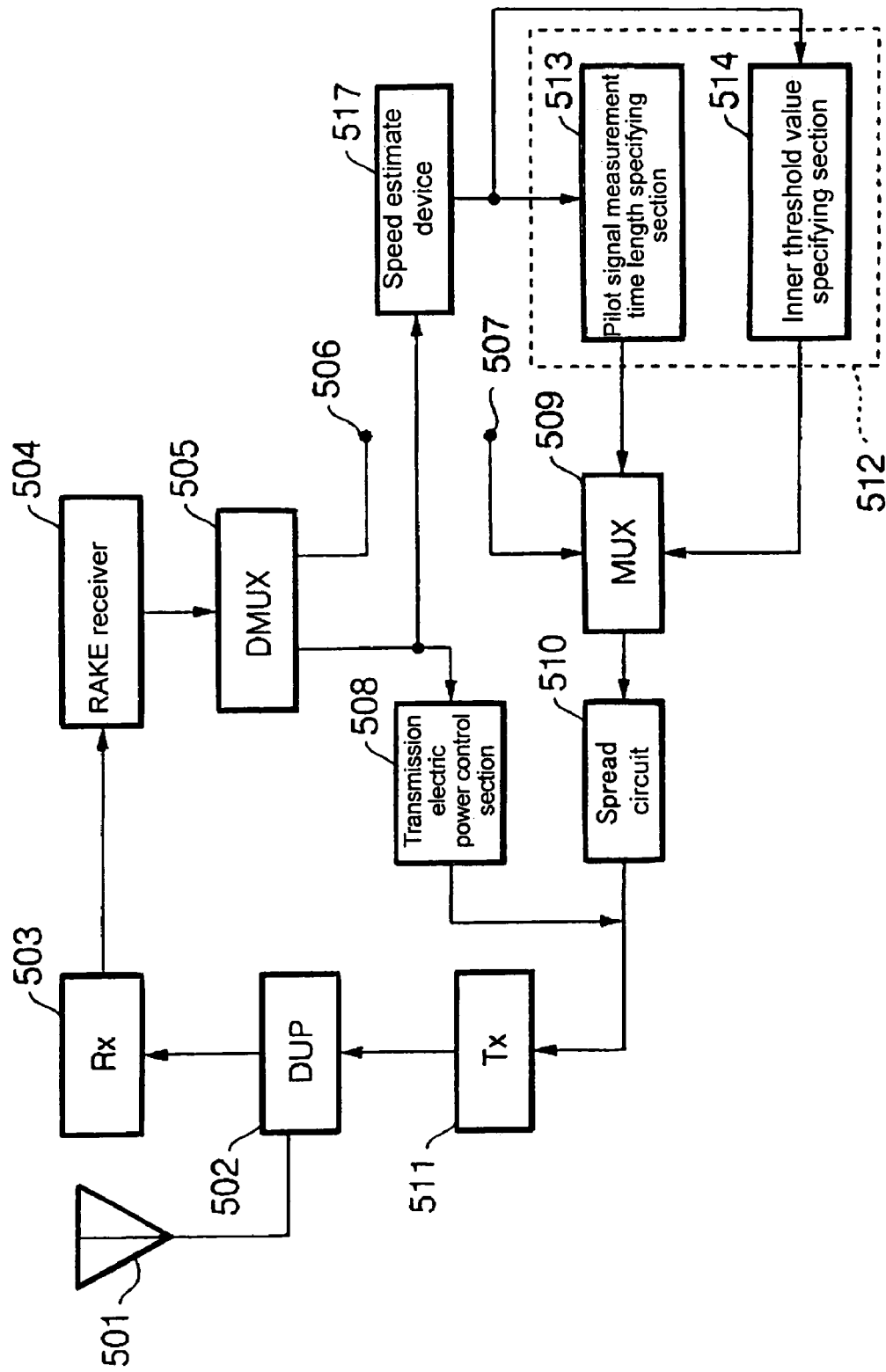
FIG. 16 is a block diagram showing the configuration of a base station according to the sixth embodiment of the present invention.

FIG. 16 is a diagram showing the configuration of the base station according to the present embodiment, the same reference numerals are designated for the corresponding parts to those in FIG. 15, and overlapping explanation thereof is omitted. The mobile station according to the present embodiment is the same as that of the fourth embodiment of FIG. 13. The cellular system to which the present embodiment is applied is the same as that of FIG. 3.

In FIG. 16, the base station according to the present embodiment is provided with the speed estimate device 517 with which the base station of FIG. 15 is not provided.

The speed estimate device 517 inputs the transmission electric power control signal multiplexed onto the transmission signal from the mobile station separated in the demultiplexer (DMUX) 505 and estimates the movement speed of the mobile station based upon the change in the transmission electric power control signal. This estimation is performed for each mobile station with which a link is set up. The pilot signal measurement time length specifying section 513 and the inner threshold value specifying section 514 are informed of the signal representing the speed of a mobile station estimated by the speed estimate device 517. Since other configuration and operations of the base station in the present embodiment are similar to those of the fifth embodiment, their explanation is omitted.

In operations of the base station in the present embodiment, the speed of the mobile station may be estimated at step 1001 of FIG. 10 that is the flow chart showing the operations of the base station controller of the second embodiment, and based upon the estimated speed V the pilot signal measurement time length and the inner threshold value may be decided at steps 1003, 1007 so that the mobile station is informed of them.

Although in the fourth embodiment, the mobile station receives the pilot signal measurement time length and the inner threshold value decided in the base station controller via the base station so as to alter the pilot signal measurement time length and the inner threshold value, it is only different therefrom in the present embodiment that the mobile station directly receives the pilot signal measurement time length and the inner threshold value decided in the base station. Thus, since the mobile station in the present embodiment can be realized by the same configuration as that of the mobile station of the fourth embodiment shown in FIG. 13, its explanation is omitted.

The present invention is not limited to each embodiment described above.

For example, the base station controller in the present invention is not limited to the configuration of FIG. 3 and may be individually installed in each base station.

Although one standard speed is set and the pilot signal measurement time length and the inner threshold value are specified at two steps in relation to the standard speed, a plurality of standard speeds may be set, and several steps of values may be set corresponding to the speeds so as to perform further detail alteration.

Although the embodiments are explained employing the movement speed of the mobile station as an example of a propagation environment or a change in a propagation environment, as another example for a propagation environment or a change in a propagation environment, the number of effective multipass can be deemed. Since the smaller the number of effective multipass the more macro-diversity effect is increased, control may be performed so that the inner threshold value is made greater.

INDUSTRIAL APPLICABILITY

As explained above, with the present invention, transmission base stations can be decided for each mobile station under an optimum condition corresponding to the movement speed of the mobile station. Thus, transmission base stations can be decided so that the number of transmission base stations can be decreased as small as possible and the probability that the best base station is included in the transmission base stations is made higher. As a result, interference in downlink can be decreased, and the link capacity can be increased.

The invention claimed is:

1. A mobile communication control method in which one or a plurality of base stations transmit a pilot signal at a predetermined electric power, the method comprising:

periodically measuring, by one or a plurality of mobile stations, a reception quality of each pilot signal transmitted from the one or a plurality of base stations to decide one or a plurality of base stations with which links are set up corresponding to the measurement result and decide one or a plurality of transmission base stations from among the decided one or a plurality of base stations, estimating, by the one or plurality of mobile stations, a movement speed of the mobile station, deciding, by the one or plurality of mobile stations, a threshold value of the pilot signal quality based upon the movement speed of the mobile station, and deciding, by the one or plurality of mobile stations, the one or plurality of transmission base stations based upon the threshold value, wherein the faster the movement speed of the mobile station, the greater the threshold value is made.

2. A mobile communication control method in which one or a plurality of base stations transmit a pilot signal at a predetermined electric, power, the method comprising:

periodically measuring, by one or a plurality of mobile stations, a receptjon quality of each pilot signal transmitted from the one or a plurality of base stations to decide one or a plurality of base stations with which links are set up corresponding to the measurement result and decide one or a plurality of transmission base stations from among the decided one or a plurality of base stations, estimating, by the one or plurality of base stations, the movement speed of the one or plurality of mobile stations, deciding, by the one or plurality of base stations, a threshold value of the pilot signal quality for each of the mobile stations based upon the movement speed of the mobile station, and informing a corresponding mobile station, and deciding, by the one or plurality of mobile stations, the one or plurality of transmission base stations based upon the threshold value, wherein the faster the movement speed of the mobile station, the greater the threshold value is made.

3. A cellular system comprising:

one or a plurality of base stations which transmit a pilot signal at a predetermined electric power, and one or a plurality of mobile stations which periodically measure a reception quality of each pilot signal transmitted from the one or a plurality of base stations to decide one or a plurality of base stations with which links are set up corresponding to the measurement result and decide one or a plurality of transmission base stations from among the decided one or a plurality of base stations, the one or a plurality of mobile stations estimate movement speed of the mobile station, and decide a threshold value of the pilot signal quality based upon the movement speed of the mobile station, and end of the mobile stations decides the one or plurality of transmission base stations based upon the threshold value, wherein the faster the movement speed of the mobile station, the greater the threshold value is made.

4. The cellular system according to claim 3, wherein the movement speed of the mobile station is estimated by the mobile station.

5. The cellular system according to claim 4, wherein the mobile station includes means for multiplexing data corresponding to the movement speed of the mobile station, with transmission data to be transmitted to the base station.

6. The cellular system according to claim 5, wherein the base station includes means for demultiplexing the data corresponding to the movement speed of the mobile station, from the transmission data transmitted to the base station by the mobile station.

7. The cellular system according to claim 3, wherein the movement speed of the mobile station is estimated by the base station.

8. A cellular system comprising:

one or a plurality of base stations which transmit a pilot signal at a predetermined electric power, and one or a plurality of mobile stations which periodically measure a reception quality of each pilot signal transmitted from the one or a plurality of base stations to decide one or a plurality of base stations with which links are set up corresponding to the measurement result and decide one or a plurality of transmission base stations from among the decided one or a plurality of base stations, the one or plurality of base stations estimates the movement speed of the one or a plurality of mobile stations, decides a threshold value of the pilot signal quality for each of the mobile stations based upon the movement speed of the mobile station, and informs a corresponding mobile station, and each of the one or plurality of mobile stations decides the one or plurality of transmission base stations based upon the threshold value, wherein the faster the movement speed of the mobile station, the greater the threshold value is made.

9. A mobile station, comprising:

means for receiving a pilot signal transmitted from one or a plurality of base stations at a predetermined electric power;

means for periodically measuring a reception quality of each pilot signal transmitted from the one or plurality of base stations to decide one or plurality of base stations with which links are set up corresponding to the measurement result, and deciding one or a plurality of transmission base stations;

means for estimating movement speed of the mobile station;

means for deciding a threshold value of the pilot signal quality based upon the movement speed of the mobile station; and means for deciding the one or a plurality of transmission base stations based upon the threshold value, wherein the faster the movement speed of the mobile station, the greater the threshold value is made.

10. The mobile station according to claim 9, further comprising:

means for multiplexing data corresponding to the movement speed of the mobile station, with transmission data to be transmitted to the base station.

11. A base station, comprising:

means for transmitting a pilot signal at a predetermined electric power, means for deciding one or a plurality of base stations with which links are set up decided corresponding to a reception quality of the pilot signal periodically measured in one or a plurality of mobile stations, and receiving information of one or a plurality of transmission base stations selected from among the decided one or a plurality of base stations, means for estimating the movement speed of the one or a plurality of mobile stations, means for deciding a threshold value of the pilot signal quality for each of the mobile stations based upon the movement speed of the mobile station to inform a corresponding mobile station, and means for letting the one or a plurality of mobile stations decide the one or plurality of transmission base stations based upon the threshold values, wherein the faster the movement speed of the mobile station, the greater the threshold value is made.

12. The base station according to claim 11, further comprising:

means for demultiplexing data corresponding to the movement speed of the mobile station, from transmission data transmitted to the base station by the mobile station.

* * * * *